(12) United States Patent
Halalay

(10) Patent No.: US 8,069,717 B2
(45) Date of Patent: Dec. 6, 2011

(54) METHOD FOR DIAGNOSING MACHINE FAULT BY ANALYZING HYDRAULIC FLUID

(75) Inventor: Ion C. Halalay, Grosse Point Par, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 662 days.

(21) Appl. No.: 12/199,823

(22) Filed: Aug. 28, 2008

(65) Prior Publication Data

US 2010/0051518 A1    Mar. 4, 2010

(51) Int. Cl.
*G01N 7/20* (2006.01)
(52) U.S. Cl. .......................................... 73/168
(58) Field of Classification Search .................. None
See application file for complete search history.

(56) References Cited

U.S. PATENT DOCUMENTS

| | | | | |
|---|---|---|---|---|
| 2,939,011 | A | * | 5/1960 | Bisso et al. ................. 250/304 |
| 4,615,413 | A | * | 10/1986 | Stevenson ..................... 184/6.4 |
| 5,968,371 | A | * | 10/1999 | Verdegan et al. ............. 210/739 |

* cited by examiner

*Primary Examiner* — Robert Raevis

(57) ABSTRACT

Method for monitoring conditions within a plurality of machines that receive fluid from a common source includes providing a supply line extending from the common source to an inlet at each of the machines. A return line is also provided that extends from an outlet at each of the machines to the common source to return fluid from each of the machines to the common source. A particulate filter is provided at the outlet of each of the machines so that each of the particulate filters will capture the particulates that were added to the fluid in the particular one of the machines with which that filter is associated. The particulate filters are periodically examined to determine the buildup of particulates that were generated within that particular machine. The particulate build up indicates whether or not a machine is in need of repair.

20 Claims, 2 Drawing Sheets

Normal Operation

Filter Examination

Normal Operation

Filter Examination

METHOD FOR DIAGNOSING MACHINE FAULT BY ANALYZING HYDRAULIC FLUID

FIELD OF THE INVENTION

The present invention relates to a method for diagnosing machine faults by monitoring the condition of hydraulic fluids so that maintenance can be performed.

BACKGROUND OF THE INVENTION

It is well known in manufacturing plants to connect a number of hydraulically operated machines to a common hydraulic fluid storage tank. For example, in an automotive stamping plant, a plurality of stamping presses will be connected to a common fluid storage tank because it is less costly and more convenient to maintain one common storage tank rather than a storage tank associated with each of the presses.

It is well known that the hydraulic fluid needs to be filtered because particulates can enter the fluid during operation of the presses. The particulates arise from the wear of the hydraulic seals and other moving parts that make up hydraulic cylinders, hydraulic valves, and other parts of the hydraulic piping system. The presence of the particulates within the hydraulic fluid creates an abrasive effect which will cause the generation of additional particulates by further wearing away at the seals, cylinders and valves.

It is well known to provide a hydraulic fluid filter at the outlet of the common fluid storage tank so that all of the fluid will pass through the filter, thus capturing the particulates and keeping the particulates out of the machinery. It is also known to periodically change the hydraulic fluid and clean the storage tanks.

It is also well known that the generation of particulates is reduced when the stamping presses receive proper periodic preventive maintenance, which may entail replacement of seals and valves and cylinders that may be deteriorating and thereby adding to the particulate problem.

It would be desirable to provide a method for the early diagnosis of machine faults of the type that create particulates so that the generation of particulates can be controlled by performing timely maintenance, rather than simply relying upon filters and sedimentation inside the tank to capture the particulates once they are generated.

SUMMARY OF THE INVENTION

Method for monitoring conditions within a plurality of machines that receive fluid from a common source includes the steps of providing a supply line extending from the common source to an inlet at each of the plurality of machines to supply fluid to each of the machines. A return line is also provided that extends from an outlet at each of the plurality of machines to the common source to return fluid from each of the machines to the common source. A particulate filter is provided at the outlet of each of the plurality of machines so that each of the particulate filters will capture the particulates that were added to the fluid in the particular one of the machines with which that filter is associated. Then, each of the particulate filters are periodically examined to determine the buildup of particulates that were generated within that particular machine, and then determining by the magnitude of such particulate whether or not the machine is in need of repair.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
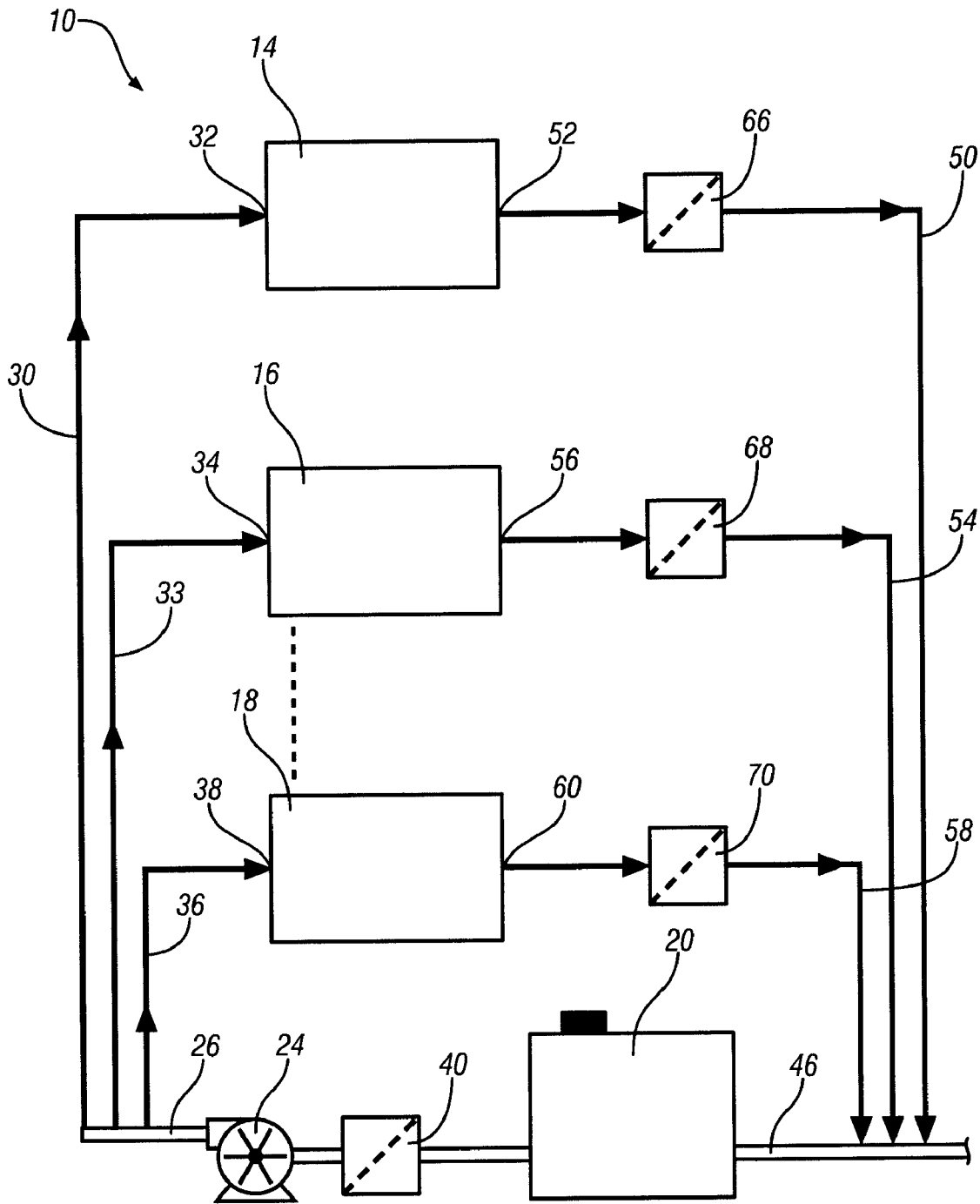
FIG. 1 is a schematic diagram of a hydraulic fluid circuit in which a common hydraulic fluid source provides pressurized hydraulic fluid to a plurality of machines.

Referring to FIG. 1, a schematic is shown for a hydraulic circuit in which hydraulically operated machines such as stamping presses 14, 16 and 18 receive hydraulic fluid from a common supply tank 20. Hydraulic fluid is drawn from the supply tank 20 by a pump 24 in order to provide pressurized fluid to a supply manifold 26. A supply line 30 extends from the supply manifold 26 to an inlet 32 of the stamping press 14. Likewise, a supply line 33 extends from the supply manifold 26 to an inlet 34 at the stamping press 16. And a supply line 36 extends from the supply manifold 26 to an inlet 38 at the stamping press 18. A filter 40 is provided between the storage tank 20 and the pump 24 to capture particulates and thereby assure the supply of clean hydraulic fluid to the pump 24.

FIG. 1 also shows a fluid return manifold 46 connected to the storage tank 20. A return line 50 extends from an outlet 52 of the stamping press 14 and is connected to the return manifold 46. A return line 54 extends between an outlet 56 of the stamping press 16 and the return manifold 46. Likewise, a return line 58 extends between an outlet 60 of the stamping press 18 and the return manifold 46.

Thus, as seen in FIG. 1, it will be understood that hydraulic fluid from the common storage tank 20 will be filtered by the filter 40, pressurized by the pump 24, and supplied to each of the stamping presses 14, 16 and 18. Then, pressurized fluid returns from the stamping presses 14, 16 and 18 to the storage tank 20.

It is characteristic of hydraulic circuitry that over time wear of various parts of the circuitry may introduce particulates into the hydraulic fluid. For example, hydraulic cylinders, pumps, valves and other components may have seals and other moving parts that degrade over time to produce particulates that become entrained in the fluid stream.

According to my invention, it is seen in FIG. 1 that a filter is provided in the return line of each of the stamping presses in order to capture particulates that were added to the fluid in that particular machine. In particular, filter 66 is provided in the return line 50 downstream of the outlet 52 of the stamping press 14, filter 68 is provided in the return line 54 downstream of the outlet 56, and filter 70 is provided in the return line 58 downstream of the outlet 60. Each of these filters 66, 68 and 70 will be periodically examined in order to determine the amount of accumulated particulates captured by the filter. For example, the filter media can be removed for laboratory examination including well-known analytical laboratory techniques such as light scattering or inductively-coupled plasma atomic spectroscopy (ICP). As an alternative, the filter can be monitored online through the use of non-destructive monitoring techniques such as X-ray fluorescence, ultrasound attenuation or optical opacity measurement. An examination of the accumulated particulates is not limited to a determination of the gross magnitude of collected particulates, but can include examination and classification of the particles size, material composition or other attributes of the particulates to more closely determine the particular part of the stamping press that is undergoing degradation and in need of maintenance and repair.

By performing the aforedescribed periodic examinations of each of the filters, the factory maintenance staff can monitor and determine the extent to which each of the individual stamping presses is being degraded and accordingly, can determine which particular stamping press is in need of repair or preventive maintenance.

Figure 2:
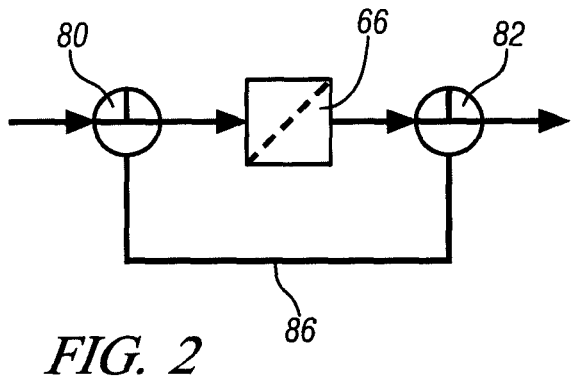
FIG. 2 is a more detailed schematic showing the valves that control the flow of hydraulic fluid at the filter provided at the outlet of each of the machines.

Referring to FIG. 2, a more particular hydraulic schematic is shown for the filter 66 of FIG. 1. A valve 80 is provided at the inlet of the filter 66, and a valve 82 is provided at the outlet of the filter 66. A bypass line 86 extends between the valves 80 and 82. In FIG. 2, the valves 80 and 82 are in an open position in which 100% of the hydraulic flow passes through the filter 66 and the bypass pipe 86 is completely closed.

Figure 3:
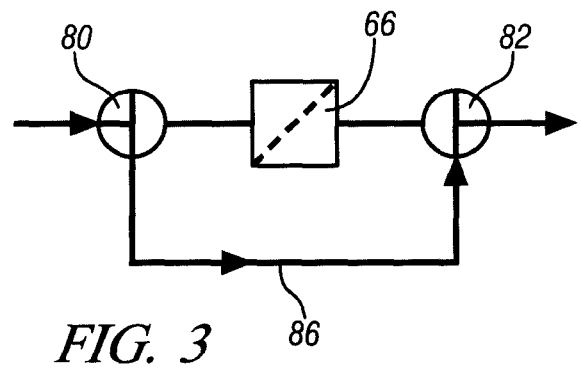
FIG. 3 shows the valves of FIG. 2 isolating the filter to facilitate examining the filter.

In FIG. 3, the valves 80 and 82 have been shifted so that 100% of the hydraulic flow is through the bypass line 86, and none of the flow is through the filter 66. Thus, FIG. 3 shows the filter temporarily isolated and taken out of the hydraulic flow circuit so that the press can be operated, if needed, while the filter 66 is removed or opened up for examination of the particulates captured therein.

Figure 4:
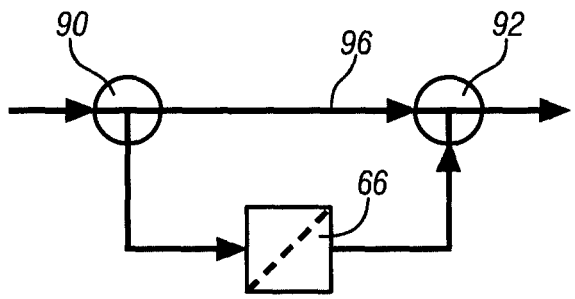
FIG. 4 is a schematic similar to FIG. 2 but showing a valve arrangement where only a portion of the flow of hydraulic fluid passes through the filter for collection of particulates.

Referring to FIG. 4, an alternative hydraulic schematic is shown for the filter 66 of FIG. 1. A valve 90 is provided at the inlet of the filter 66, and a valve 92 is provided at the outlet of the filter 66. A bypass line 86 extends between the valves 90 and 92. In FIG. 2, the valves 90 and 92 are in an open position in which a portion of the hydraulic flow passes through the filter 66 and a portion of the hydraulic flow passes through the bypass pipe 96. Thus in FIG. 4, only a portion of the hydraulic flow is being sampled for its particulate content.

Figure 5:
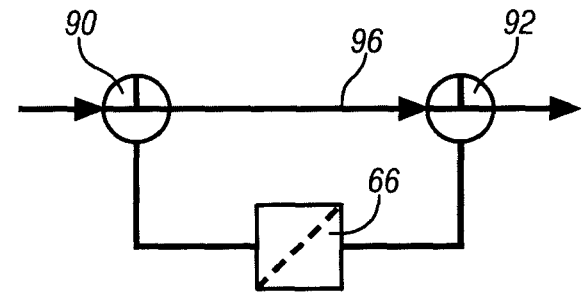
FIG. 5 shows the valves of FIG. 4 isolating the filter to facilitate examining the filter.

In FIG. 5, the valves 90 and 92 have been shifted so that 100% of the hydraulic flow is through the bypass line 96, and none of the flow is through the filter 66. Thus, FIG. 3 shows the filter temporarily isolated and taken out of the hydraulic flow circuit so that the press can be operated, if needed, while the filter 66 is removed or opened up or otherwise examined for determination of the particulates captured therein.

It will be understood that the hydraulic circuits shown in FIG. 1 through 5 is a simple circuit shown to illustrate the methodology of the invention, and, additional valves and pressure gauges and other circuit elements can be added as need and appropriate for the particular equipment that is being operated. In this regard, it will be understood that in some machinery, the hydraulic fluid is used to operate cylinders that perform various stamping and positioning operations, whereas in other hydraulic systems, the hydraulic fluid is used more in the nature of providing control pressures for the operation of valves and other components. The methodology of this invention can be employed in any hydraulic operating system where multiple machines or control circuits use hydraulic fluid from a common source, and it will be advantageous to determine the exact location of a performance degradation within the larger hydraulic system.

Thus the foregoing description of the invention is merely exemplary in nature and, thus, variations thereof are intended to be within the scope of the invention.

What is claimed is:

1. A method for monitoring conditions within a plurality of machines that receive fluid from a common source; comprising:
    providing a supply line extending from the common source to an inlet at each of the plurality of machines to supply fluid to each machine;
    providing a return line that extends from an outlet at each of the plurality of machines to the common source to return fluid from each of the machines to the common source;
    providing a particulate filter at the outlet of each of the plurality of machines so that each of the particulate filters will capture the particulates that were added to the fluid in the particular one of the machines with which that filter is associated;
    periodically removing and examining a filter media of the particular filter associated with a particular machine and examining the build-up of particulates and determining thereby whether that particular machine is generating particulates indicative of a need to repair that particular machine.

2. The method of claim 1 further comprising providing a master filter between the common source and the supply line so that the fluid supplied to each of the plurality of machines has the same loading of particulates therein.

3. The method of claim 1 further comprising providing a valve and bypass at each of the filters so that by operating the valve the filter is isolated from the fluid flow and to permit examination of the particulate magnitude.

4. The method of claim 3 further comprising either cleaning or replacing the filter after the examination of the particulate magnitude.

5. The method of claim 1 further comprising the common source including a reservoir of fluid and a pump for drawing fluid from the reservoir and a master filter to assure that the fluid supplied to each of the plurality of machines has the same loading of particulates therein.

6. The method of claim 1 further comprising providing a valve and bypass at each of the filters, and closing the valve during normal machine operation so that all of the fluid flow is through the filter during normal machine operation and, by operating the valve, the filter is isolated from the fluid flow to permit examination of the particulate magnitude.

7. The method of claim 1 further comprising providing a valve and bypass at each of the filters, said bypass operating during normal machine operation to bypass a portion of the fluid flow around the filter and send the remaining portion of the fluid flow through the filter for particulate collection, and, by operating the valve, the filter is isolated from the fluid flow and to permit examination of the particulate magnitude.

8. The method of claim 1 further comprising examination of the accumulated particulates to determine at least the determination of the gross magnitude of collected particulates.

9. The method of claim 1 further comprising examination of the accumulated particulates to determine at least the classification of the particle size or material composition to more closely determine the particular part of the machine that is undergoing degradation and in need of maintenance and repair.

10. A method for monitoring conditions within a plurality of machines that receive fluid from a common source; comprising:

providing a supply line extending from the common source to an inlet at each of the plurality of machines to supply fluid to each machine;

providing a return line that extends from an outlet at each of the plurality of machines to the common source to return fluid from each of the machines to the common source;

providing a particulate filter at the outlet of each of the plurality of machines so that each of the particulate filters will capture the particulates that were added to the fluid in the particular one of the machines with which that filter is associated;

providing a valve and bypass at each of the filters so that by operating the valve the filter is isolated from the fluid flow to permit examination of the particulate;

periodically examining the particular filter associated with a particular machine and examining the build-up of particulates within the machine and determining thereby whether that particular machine is generating particulates indicative of a need to repair that particular machine.

11. The method of claim 10 further comprising providing a master filter between the common source and the supply line so that the fluid supplied to each of the plurality of machines has the same loading of particulates therein.

12. The method of claim 10 further comprising operating one of said valve and bypass so that all of the fluid flow is through the filter during normal machine operation and, by operating said one of said valve and bypass, the filter is isolated from the fluid flow and all of the fluid flow is through the bypass so that the machine can continue to operate during the examination of the filter.

13. The method of claim 10 further comprising operating one of said valve and bypass during normal machine operation to bypass a portion of the fluid flow around the filter and send the remaining portion of the fluid flow through the filter for particulate collection, and, by operating the one of said valve and bypass, the filter is isolated from the fluid flow to permit examination of the filter.

14. The method of claim 10 further comprising examination of the accumulated particulates to determine one of at least the gross magnitude of collected particulates, the classification of the particle size, or material composition to more closely determine the particular part of the stamping press that is undergoing degradation and in need of maintenance and repair.

15. The method of claim 10 further comprising examination of the filter by light scattering.

16. The method of claim 10 further comprising examination of the filter by ICP analysis.

17. The method of claim 10 further comprising monitoring the filter by X-ray fluorescence.

18. The method of claim 10 further comprising monitoring the filter by ultrasound attenuation.

19. The method of claim 10 further comprising monitoring the filter by optical opacity measurement.

20. A method for monitoring conditions within a plurality of machines that receive fluid from a common source; comprising:

providing a supply line extending from the common source to an inlet at each of the plurality of machines to supply fluid to each machine, said common source including a reservoir, a pump, and a master filter collecting particulates from the fluid;

providing a return line that extends from an outlet at each of the plurality of machines to the common source to return fluid from each of the machines to the common source;

providing a particulate filter at the outlet of each of the plurality of machines so that each of the particulate filters will capture the particulates that were added to the fluid in the particular one of the machines with which that filter is associated;

providing a valve and bypass at each of the filters so that by operating the valve the filter is isolated from the fluid flow and to permit examination of the particulate;

and periodically examining the particular filter associated with a particular machine and examining the build-up of particulates within the machine to determine at least one of the gross magnitude of collected particulates, the classification of the particle size, or material composition of the particles to closely determine the particular part of the stamping press that is undergoing degradation and in need of maintenance and repair.

\* \* \* \* \*